July 5, 1966  E. C. BAROCELA  3,259,450
OPTICAL COMPENSATOR
Filed Jan. 28, 1965  4 Sheets-Sheet 1

INVENTOR
EDWARD C. BAROCELA
by Bierman + Bierman
ATTORNEYS

July 5, 1966  E. C. BAROCELA  3,259,450
OPTICAL COMPENSATOR
Filed Jan. 28, 1965  4 Sheets-Sheet 2

INVENTOR
EDWARD C. BAROCELA by Bierman & Bierman
ATTORNEYS

July 5, 1966        E. C. BAROCELA        3,259,450
OPTICAL COMPENSATOR

Filed Jan. 28, 1965        4 Sheets-Sheet 4

INVENTOR.
EDWARD C. BAROCELA
BY
Bierman + Bierman
ATTORNEYS

United States Patent Office 3,259,450
Patented July 5, 1966

3,259,450
OPTICAL COMPENSATOR
Edward C. Barocela, Levittown, N.Y., assignor to Instruments Corporation of America, a corporation of New York
Filed Jan. 28, 1965, Ser. No. 429,956
11 Claims. (Cl. 352—119)

This invention refers to a rotating optical compensator for receiving the light rays from an object moving at constant speed and for focussing the rays into a stationary image. It has particular reference to an optical compensator which can be used with motion picture cameras or projectors for photographing discrete images as frames on a moving motion picture film and for reproducing these discrete images onto a screen while the film is moving through an object plane at a constant speed. It has also reference to means for synchronizing the relative speeds of the film and the compensator. This application is a continuation-in-part of Serial No. 207,189, filed January 3, 1962, now abandoned and Serial No. 348,398, filed March 2, 1964, now abandoned.

The need for an optical compensator for use with motion picture cameras and projectors has been recognized for many years. One of the first of the so-called compensators was developed by Raynaud in France in 1877, using a plurality of mirrors secured to the periphery of a rotating drum. Other systems, including the rotating prism, have been in use for many years in high speed motion picture cameras and the rotating prism has also been used in machines for editing motion picture film because of the simple threading mechanism possible with such a system.

The rotating prism, or rotating cube, has never been used in commercial projectors for showing entertainment pictures on a large screen before an audience because of the inherent aberrations and other errors that act to show a poor image. The present device is not a cube but instead a plurality of convex lens surfaces moving in front of the film in one direction while the centers of curvature move in an arc in the other direction. The resulting compensator eliminates many of the aberrations existing in prior optical systems and those which do exist are easily compensated for by other lenses used to focus the light rays either on the film or on a projecting screen.

One of the objects of this invention is to provide an improved compensator which avoids one or more of the disadvantages and limitations of prior art optical systems.

Another object of the invention is to reduce the problems encountered when running a film having already damaged sprocket holes.

Another object of the invention is the elimination of noise from motion picture cameras and projectors.

Another object of the invention is to eliminate the need of synchronizing a motion picture film with a television system. With this device a picture is continuously available without the usual intermittent blanking sequence.

Another object of the invention is to project a steady undistorted picture onto a screen while the film moves at a constant speed.

Another object of the invention is to omit the necessity of cutting sprocket holes in the film.

Another object of the invention is to increase the life of the film by omitting the start-stop type of intermittent motion used by prior art cameras and projectors and to permit the use of thinner film.

Another object of the invention is to eliminate the flicker and eye strain normally present in prior art projectors.

Another object of the invention is to give more area for the sound track and to permit the sound record to be closer to the corresponding picture frame.

The invention comprises a motion picture camera or projector using film which has discrete picture frames. The film is run through an object plane at a constant speed and a rotating transparent refractor converts the continuous motion into an intermittent production of the frame image in an image plane. The refractor comprises a block having a plurality of convex faces of equal radii and subtending equal angles. The faces have their centers of curvature symmetrically located around the axis of rotation of the block and at equal distances from the rotating axis.

For a better understanding of the present invention, together with other and further objects thereof, reference is made to the following description taken in connection with the accompanying drawings, in which.

Figure 1:
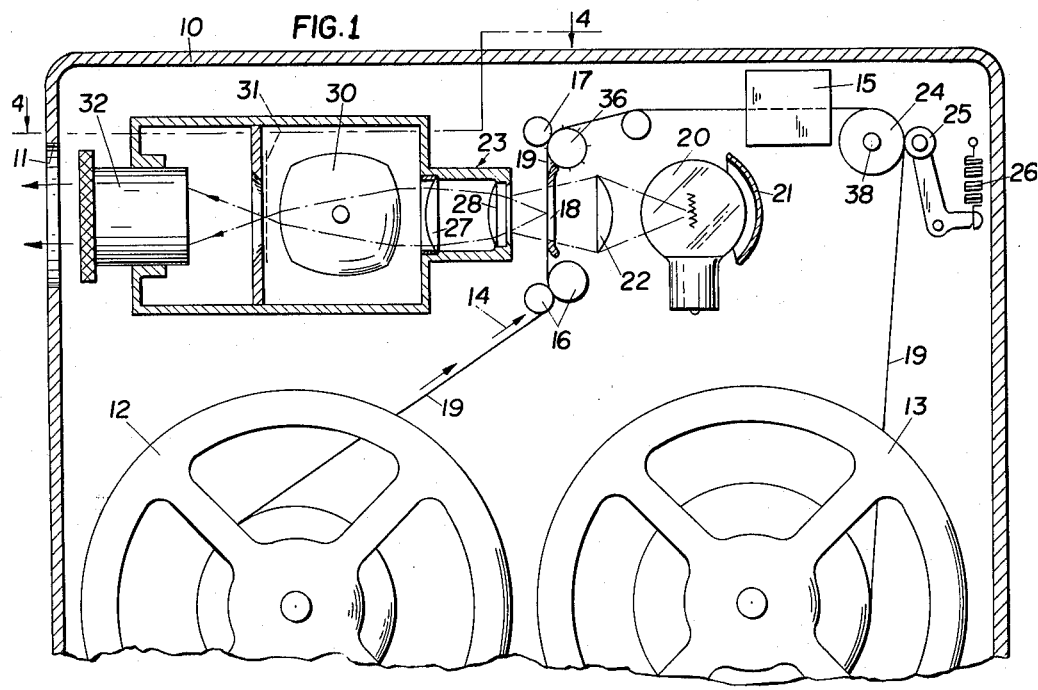
FIG. 1 is a general cross-sectional view of a projector made according to the present invention, with some details omitted and some components shown in block form.

FIG. 1 shows the optical system and the film path of a projector that constitutes one embodiment of the invention. The rotating compensator is shown in the center of the optical system, while the auxiliary relay optics are located between the film gate and the compensator. The projection lens shown in front of the compensator is of conventional design. When such a relay system is used, the film has to travel upwards, contrary to convention, because the relay inverts the image in addition to the regular inversion introduced by the projection lens. The film gate, as in any non-intermittent machine, has an aperture high enough to expose two film frames, since each frame has to be kept exposed to the light during the full cycle.

Figure 4:
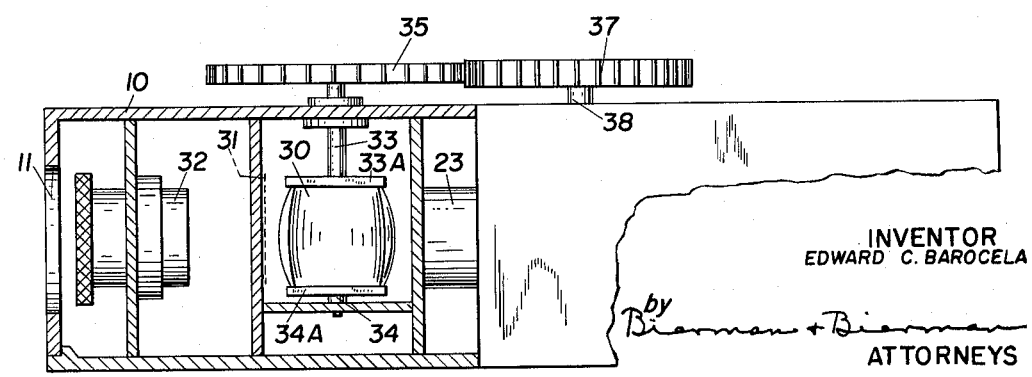
FIG. 4 is a cross-sectional view of the projector shown in FIG. 1 and is taken along line 4—4 of that figure.

Referring now to FIGS. 1 and 4, the projector includes a container 10 having an opening 11 for the projected beam. Inside the container, two film storage reels 12 and 13 are mounted, with a gate mechanism and a sound reproducing head 15 mounted intermediate to the two reels for illuminating the film 19 and for reproducing the sound recorded on the film sound track. It should be noted that the sound head is mounted close to the optical object plane and not a considerable distance from it as is the usual custom. The present arrangement facilitates editing, cutting, and splicing the film.

The gate mechanism includes the usual entrance rollers 16 and exit roller 17 and sprocket wheel 36 with a gate pad 18 in the object plane. A lamp 20 and a reflector 21 furnish light for the projected beam in the usual manner and a condensing lens 22 directs the light toward the film and the first component 23 of the projection lens system. It is to be understood that two of the rollers of the combinations 16 and 17 can be moved to the left (as seen in FIG. 1) to permit the film to be threaded into the gate prior to starting. Such mechanisms are old in the art and need not be described here in detail.

After passing through the sound reproducing device 15, the film 19 passes around a power capstan roller 24 which is connected to a motor drive (not shown) for continuous rotation. The film is held in contact with roller 24 by a resiliently mounted smaller roller 25 held in place by a spring 26. In accordance with well-known and conventional practice the film take-up reel 13 is turned by the same motor means as roller 24 but through a slipping clutch or a slipping belt so that some tension is always exerted on the film after it passes power roller 24.

Light from the film 19 in gate 18 is focussed into a beam by an optical system 23 which may comprise one or more lenses 27, 28 and by the convex surface 30–1 of the refractor. Then the light beam proceeds inside the rotatable refractor block 30 which in this case consists of four convex surfaces, as shown in FIG. 1, and rotates about an axis which is perpendicular to the axis of the light beam but is parallel to the surface of the film in gate 18. After leaving the refractor block 30 the light beam is focussed in an image plane 31 which is quite close to the exit portion of the refractor and then, this image is again focussed to a second image at a viewing screen (not shown) by a conventional projection lens system 32.

The mounting for the refractor block 30 is shown in greater detail in FIG. 4 where a stub shaft 33 is terminated by a plate 33A on which the block 30 is cemented. In a similar manner a second stub shaft 34 is terminated by a plate 34A which is cemented to the opposite face of the block. The stub shaft 33 is mounted in bearings and is connected to gear 35 which is coupled by means of an idler gear (not shown) to gear 37 on shaft 38. Shaft 38 is connected to sprocket wheel 36. It is necessary that the film movement and the refractor rotation be closely coupled and move in perfect synchronism.

Figure 5:
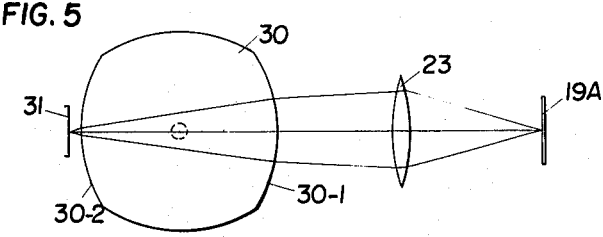
FIGS. 5, 6 and 7 are diagrams showing the operation of the rotating refractor and indicating the manner in which the continuous motion of the film is converted into an intermittent image in a stationary image plane.
Figure 6:
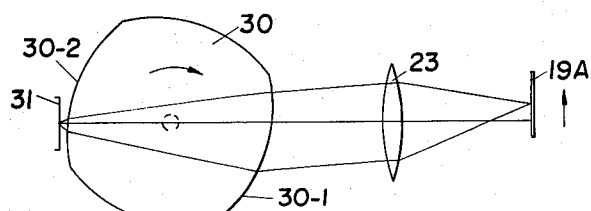
Figure 7:
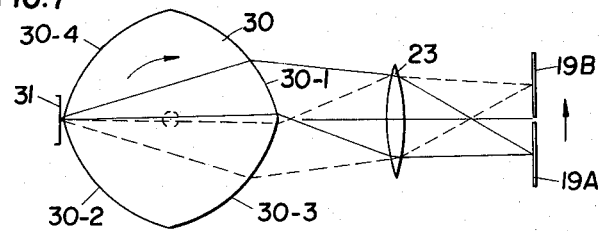

FIGS. 5, 6 and 7 show the manner in which the constantly moving film 19 is focussed to a stationary image in plane 31. In FIG. 5 a four-sided refractor is shown with convex entrance surface 30–1 and a convex exit surface 30–2 in alignment with the axis of the light beam from film 19 and lens 23. For correct synchronization, the refractor must be in this position when the film picture frame 19A is in its median position in the gate. It is obvious that, under these conditions, the center of the frame is focussed at the center of the image plane 31.

In FIG. 6 the refractor has moved 22½ degrees or one-sixteenth of a revolution. During this time the film frame 19A has moved up one-quarter of a frame and light from the central portion travels in an off-axis direction to the refractor. Since the entrance surface 30–1 has been moved to a new position, the light beam is refracted toward the axis and upon emerging, the beam is focussed at the same central position as indicated in FIG. 5.

In FIG. 7 the refractor 30 has been rotated one-eighth of a revolution so that the edges of the surfaces are in axial alignment with the optical system. During this time the film frame 19A has moved one-half of its height upward and the next succeeding frame 19B is just below the optical axis. The light beam from the upper frame 19A still transverses (dotted lines) entrance surface 30–1 to be focussed at the center of the image plane 31. The light beam from the lower frame 19B traverses (solid lines) entrance surface 30–3 to be focussed at the same spot.

When one frame has reached the end of its travel, and a new frame appears in the aperture of the gate, the compensator also reaches a point in its rotation where the edge between two surfaces crosses the optical axis. In this position, the optical system is focused on two different frames, and the picture projected on the screen consists of two images superimposed. As the compensator rotates, this results in a dissolving effect, whereby one frame is gradually replaced by the next frame. The light level on the screen remains the same during the complete cycle, because the aperture of the optical system remains constant, even though at one point it is shared by two surfaces of the compensator.

In a camera, the operation is similar, but with the direction of the light rays reversed. Instead of the projection lens shown, a photographic lens is used to form an image in front of the compensator. The relay system then forms an image of this on the film plane, this second image being displaced vertically by the rotating compensator in order to follow the movement of the film, so that the image remains stationary with respect to the surface of the film. When this system is used in a high-speed camera, the image is focused on the film during the full cycle of each frame, therefore the exposure time is equal to the reciprocal of the frame frequency. That is to say that at 1000 frames per second, for instance, the exposure is one thousandth of a second. A variable shutter can of course be added if it is desired to have control over the exposure time.

Figure 2:
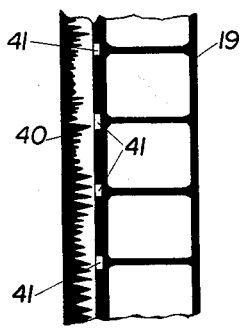
FIG. 2 is an elevation of a piece of film showing the discrete frames and density marks used for synchronism.
Figure 3:
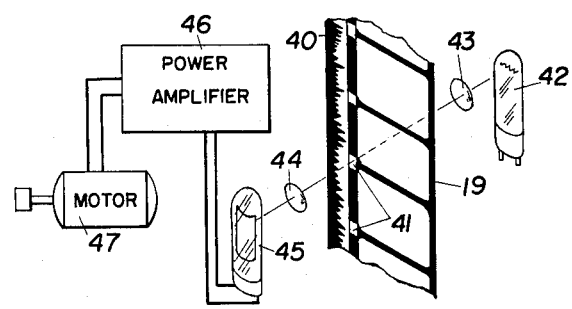
FIG. 3 is a showing of the light sensing device coupled to an electric motor for rotating the refractor.

From the above description it is obvious that the film and refractor must move in synchronism and be tightly coupled to each other. A set of gears will work but only if sprocket holes and sprocket wheels are used. Another device for synchronizing is illustrated in FIGS. 2 and 3. FIG. 2 shows the film 19 with a conventional sound track 40 at one edge. Also, a series of density marks 41 is placed on the film, one to each frame. These marks must be correctly aligned with the frames in the same position as the perforations in conventional film. This makes for a compatible system that will work equally well with conventionally perforated film, since the light sensing device described below will react to the perforations as well as to the density marks 41.

The absence of perforations makes it possible to coat the film emulsion on a thinner base, with the result that much more film can be wound in a conventional reel, with a consequent increase in the running time. When such a film is run through a projector equipped for this type of synchronism an auxiliary light sensing device senses each mark, transforms the marks into electrical pulses and uses the pulses to run a synchronous motor coupled to the rotating refractor. Such a device is shown in FIG. 3 where a lamp 42 transmits light through a lens system 43 to the marks 41. Some of the light from projection lamp 20 could also be used for this purpose. The transmitted light pulses are collected by another lens system 44 and sent to a photo-sensitive transducer 45 (which may be a photoelectric cell) connected to the input terminals of a power amplifier 46. In the case of conventional perforations, the light sensing device will scan one side of the perforations (the side adjacent to the picture frame).

The power amplifier may simply amplify the pulses and apply them to synchronous motor 47 coupled to shaft 33 (FIG. 4) in the absence of gears. However, since the optical system represented by lamp 42 and lens 43 usually projects a narrow light "slit" through the film, which is modulated by the marks 41 to produce a square wave, a more efficient system results if a series of filters is used to transform the pulses into the usual sine-wave type of alternating current which can be handled more easily by a conventional motor of this type. Or, a simpler system can be used if the light beam projected by lens 43 has a vertically elongated cross-section, preferably of oval shape. When the marks 41, or the conventional perforations, traverse this elongated aperture, the resulting modulation would produce a smoother wave shape, approximating a sine wave, which can be used to drive the motor. With this type of control the film may be speeded up or slowed down and the two movements, that of the film and the refractor, will always be in timed alignment. The use of narrow density marks permits a wider area to be used for the sound track 40, which is particularly desirable when small-format films are used.

Figure 8:
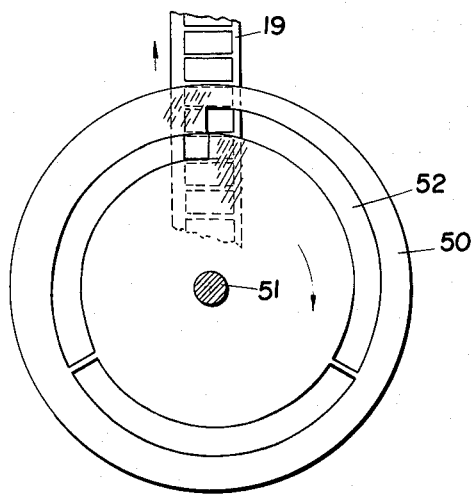
FIG. 8 is a side view of a masking disk having a spiral light-transmitting portion.

It has been found that a refractor of the type described herein is capable of picking up some extraneous light rays and, after some multiple refractions or reflections, direct them into the projected image. This can be avoided by careful design of the optical system, as will be explained later, but also, in order to eliminate this feature, a moving mask can be used, positioned adjacent to gate 18. Masks of this type can be made in many ways. One such mask is shown in FIG. 8 where a flat disk 50 is rotated on shaft 51 in a clockwise direction. A spiral 52 is cut from the mask and has a width which is equal to or slightly more than the height of a film frame. Then as the mask is rotated and the film moved up, only the light transmitted through the desired area frames will be sent to the refractor. This mask can also be used in a camera arrangement to limit the light falling on the film to one frame at a time.

Figure 9:
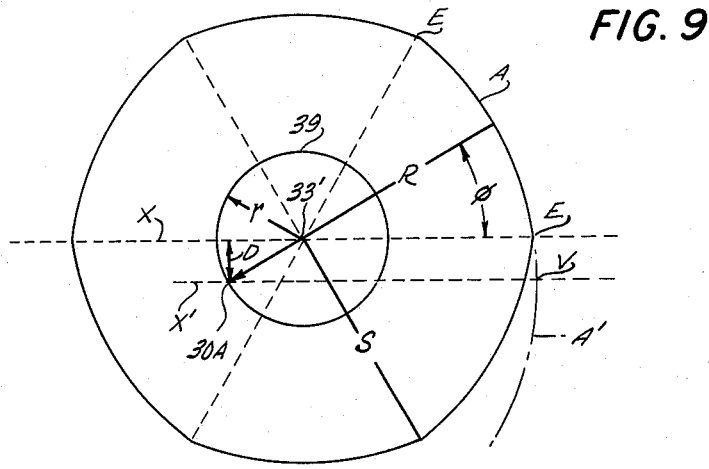
FIG. 9 is a cross-sectional view of the refractor.

The optical compensator consists of a single body of glass, or other transparent optical material, bounded by a plurality of convex surfaces (FIG. 9). These surfaces can be either spherical or cylindrical, but spherical surfaces are preferred to avoid the use of cylindrical lenses in the auxiliary optical system, as would be required if the compensator had cylindrical surfaces, in order to eliminate anamorphic distortions. The compensator can have any number of surfaces, but it has been proven that four or six surfaces provide the best possible operation, with negligible or no errors.

These convex surfaces have their centers of curvature 30A located symmetrically around the axis of rotation 33' in a circumference 39 that is perpendicular to said axis. If we consider these surfaces as part of a sphere, the compensator actually consists of a system of spheres that rotate around the axis. Since the centers of the spheres are located very close to this axis of rotation, the surfaces of the spheres intersect to form a solid body that somewhat resembles a football. Only the central portion of this body is used for the compensator, as shown in FIG. 4.

Figure 10:
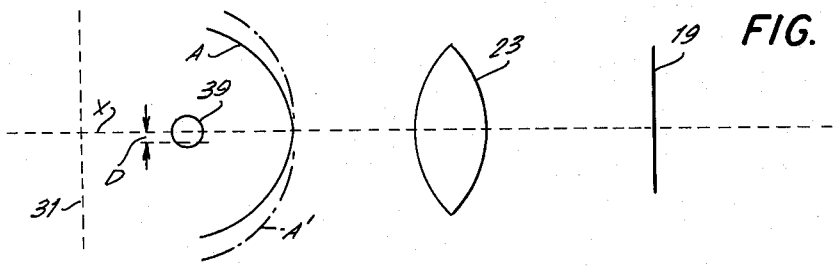
FIGS. 10, 11 and 12 are diagrams showing the principle of operation of the optical compensator.
Figure 11:
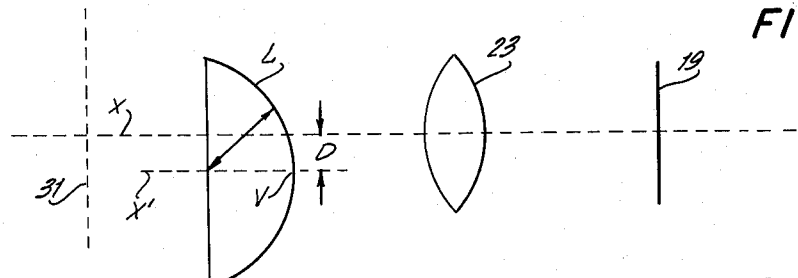

When this compensator is made a part of an optical system, these convex surfaces act as one of the lenses of the system and they contribute as such to the formation of the image. This is better understood with reference to FIGURES 10–12. The active surface of the refractor, acts as one of the lenses in the projection system, and as such it aids in focusing the rays of light at the desired image plane. But unlike the other lenses in the system, this one is moving vertically across the optical axis of the system.

Face "A," for instance (FIGS. 9 and 10) is part of the convex surface A–A'. The optical axis of this surface is coincident with the optical axis of the system when the center of curvature of the surface lies on that axis, but when the refractor rotates, the center of curvature of each convex surface describes an arc about the axis of rotation of the refractor, and the optical axis X' of the individual surfaces are displaced together with the centers of curvature a distance "D," although the individual axis X' can be considered to be parallel to the general axis at all times and to contain the vertex "V" of its surface.

Figure 12:
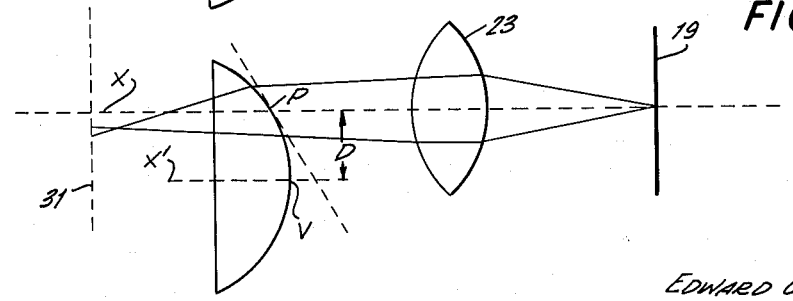

Due to this displacement, face "A" acts as a lens "L" located in the same relative position in the system (FIG. 11), and having its optical axis X' displaced vertically with respect to the axis of the system "X." According to basic principles of optics, displacing a lens in this fashion will produce a shift in the image, but will also introduce distortion unless the vertical shift is small. This is shown in FIG. 12, where it can be seen that if the distance "D" is too large, the rays of light follow uneven paths due to the mean inclination of the refracting surface at "P" which results in distortion and defocusing of the image.

If this distance "D" is kept small (as is the case in the present invention) the refracting surface is kept always nearly perpendicular to the optical axis, avoiding any noticeable distortion. It is obvious that in order to attain the main object of the invention namely, that of producing an undistorted stationary image, this distance must be small or, in practice, the centers of curvature of the surfaces must be very close to the axis of rotation of the refractor. The principle of operation of the refractor of the present invention is therefore that of displacing the centers of curvature of the acting surfaces in order to displace the image by means of the action of said surfaces as lenses, but keeping the displacement of said centers within certain limits, in order to avoid distortions in the image.

Referring again to FIG. 9, it should be noted that although the refractor may have any number of surfaces, all of these surfaces are symmetrical and have equal dimensions. Radius "R" is the same for all surfaces, and their centers of curvature are at an equal distance "r" from the center of rotation, subtending identical angles equal to $2(\phi)$. The angle subtended by each surface, between edges "E" is also equal to $2(\phi)$, while the angle $\phi$ is equal to $180°/n$, "$n$" being the number of surfaces in the refractor. In the case of a six-sided refractor shown in FIG. 9, $\phi$ is equal to $180°/6$, or $30°$.

It has laready been pointed out that, in order to avoid distortion and other defects, the distance "D" should be relatively small. Obviously, this distance is a function of the radius "r" of circumference 39 and of the half angle "$\phi$" ($D = r \sin \phi$). It will also be obvious, from an examination of FIG. 9, as well as from the above equation, that the larger the number of faces in the refractor, the larger the permissible dimension of "$r$," and consequently, of "R" also. If the refractor has a large number of surfaces, the radius "R" can become in practice infinitely large, which is the case of the familiar plane-parallel prism used as an optical compensator in the prior art.

As is well known, when such prisms are made with a sufficient large number of faces (between 16 and 24) distortion and other defects can be reduced to a minimum, since the angle of rotation of each surface is very small and consequently the maximum angle of incidence of the light rays upon the refracting surfaces is also very small.

Unfortunately, this increase in the number of surfaces causes a disproportionate rise in the difficulty and cost of manufacture, besides reducing the effective aperture of the optical system, and consequently the light efficiency of the device, because the area of the surfaces becomes small in comparison to the size of the prism.

In the present invention the excessive angle of incidence is avoided by the use of deep curvatures in the surfaces of the refractor, as explained earlier with reference to FIGS. 10, 11 and 12, therefore it is unnecessary to use more than four or six surfaces. The deep convexity of the surfaces also adds more "power" to the optical system, so that a relatively thick element, such as this refractor, can be introduced without reducing the effective aperture of the system.

It is difficult to establish rigid limits for the relative dimensions of the two basic radii "R" and "$r$," since obviously this depends on the number of surfaces used and the performance required of the device for which the particular compensator is intended, but it can be stated that the distance "D" should always be quite small compared to the radius "R." In practice this distance "D" should be substantially smaller than $R/3$.

As an example, a refractor that has been made for use with 8 mm. motion picture film has the following dimensions:

"$n$" (Number of surfaces) _____ 4
"S" (maximum radius) _____mm__ 21
"R" (radius of curvature) _____mm__ 24.4
"N" (index of refraction) _____ 1.58

A six-sided refractor also designed for 8 mm. film has these parameters: "S"—22 mm., "R"—27.9 mm. and "N"—1.62.

In this respect, it should be noted that, contrary to what might be expected, the choice of the index of refraction of the glass has little reference to the performance of the refractor as an optical motion compensator, although "crown" glasses are preferred because of their low color dispersion.

In practice, the actual index of refraction is chosen for other reasons, particularly to control the focal length of the convex surfaces with reference to the multiple refraction effect mentioned before. It has been found that this defect can be eliminated if the rays of light entering the refractor are parallel or nearly so. If the focal planes are to be properly located, this means, in most cases, that the focal lentgh of the convex surfaces have to be approximately equal to the diameter of the refractor. This parallel incidence of the light rays causes them to be refracted in different directions when the edge "E" crosses the effective aperture of the system during the frame change-over, and by careful placing of aperture stops at different points in the optical system, the rays of light carrying the "ghost" images can be effectively intercepted.

Regarding the overall size of the refractor, the most noticeable feature that attracts the attention of a persion versed in the art, is the great difference between the size of the optical compensator used in the present invention and the familiar cube or hexagonal prism used in the prior art. The present refractor is several times larger in its maximum diameter than a prism designed to perform with the same size of film. This is because the deeply curved convex surfaces that are used in order to avoid optical errors in compensation, also cause a relatively small displacement of the image compared to the larger displacement provided by the excessive angles of refraction present in the conventional prism. But in reducing the angles of refraction, the present compensator also succeeds in reducing distortion and other optical errors until they become negligible or totally eliminated.

This compensator is used as an integral part of an optical system that forms a real image of the object or film. In a motion picture projector, it is preferable to form an image of the film within the optical system itself and with unit magnification, so that it can be conveniently masked and then projected onto the screen.

FIG. 1 shows a typical arrangement that can be successfully used in movie projectors and many other types of motion picture equipment. It employs a relay system of which the compensator 30 is a part, designed so that an optically corrected image is formed at a plane 31 tangent to the exit surface of the compensator. For practical reasons, this image plane is located just in front of the compensator, barely clearing the edges of the compensator as it rotates. As in any non-intermittent system, this image contains more than one frame, therefore a mask is used at this point to limit the field to the central frame, which is then projected on the screen by means of a projection lens of conventional design.

Figure 13:
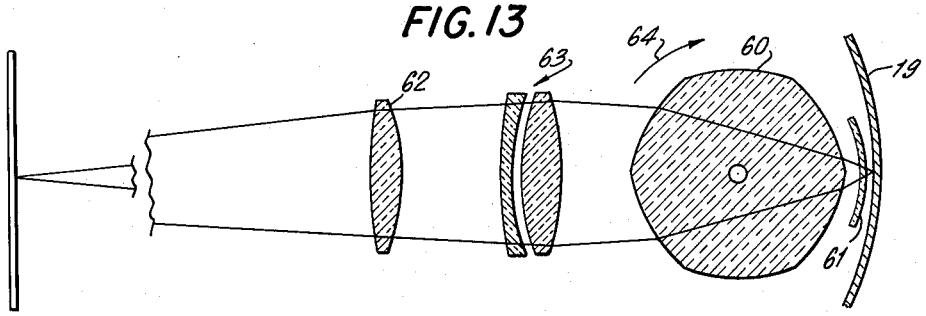
FIGS. 13, 14 and 15 are diagrams showing alternate arrangements of the optical system.

But in many applications, such as in rear projection, for instance, a relay image is not desirable or necessary. FIG. 13 shows an optical system that can be used in those cases. In this alternate arrangement, the film travels downwardly and the compensator rotates in the direction of arrow 64. The compensator 60 is located very close to the film 19, so that one of its surfaces is almost tangent to the film plane, or as close to it as possible. A thin meniscus lens 61 of small power can be used between the film and the compensator in order to guard it from dirt or scratches.

In this system, the convex surface that is farthest from the film acts as a lens focusing on the film plane with the aid of an auxiliary lens or lenses (62-63) that can be adjusted in order to focus the system at any object distance.

Since no provision is made for masking of the central frame, this arrangement is restricted to those cases where the image can be masked outside of the optical system. It can be used in rear view projectors, where the translucent screen itself limits the field of view, or in kinescope recorders and in television film projectors, where the masking is performed by the electronic tube.

It is to be understood that this optical arrangement can also be used in a projector such as that pictured in FIG. 1, in which a relay image is formed and then projected on a distant screen. Lenses 62 and 63 can be designed so that they form an image within the casing of the projector with unit magnification, this image being then projected by lens 32. The results are similar, the only difference being in the relative positions of the refractor and the auxiliary lenses with respect to the image and object planes.

Figure 14:
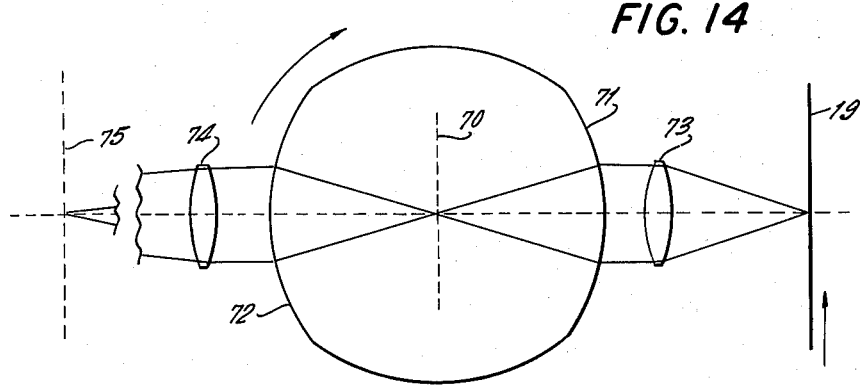

Other optical systems are possible, employing the refractor described herein as in optical compensator. FIG. 14 shows one of these alternate optical arrangements. Here the relay image is formed inside the refractor, which is designed so that each surface produces only half of the optical compensation needed for the displacement of one frame. Since both the entrance and exit surfaces are active in this embodiment of the invention, they cooperate to produce the full compensation of the movement of the film. At first sight, it might appear that the two surfaces would act to counteract each other, since they move in opposite directions, but careful examination of the diagram will show that this is not so, due to the inversion of the relay image 70 caused by the optical system composed of lens 73 and the entrance surface 71. Lens 74 can be designed so that the final image 75 is formed at the desired distance. This optical arrangement is particularly useful when the size of the device is an important consideration and a compact unit is desired. Since both the entrance and exit surfaces of the refractor are active and contribute to the optical motion compensation, a smaller refractor is possible without sacrificing performance as regards distortion and other optical errors.

Figure 15:
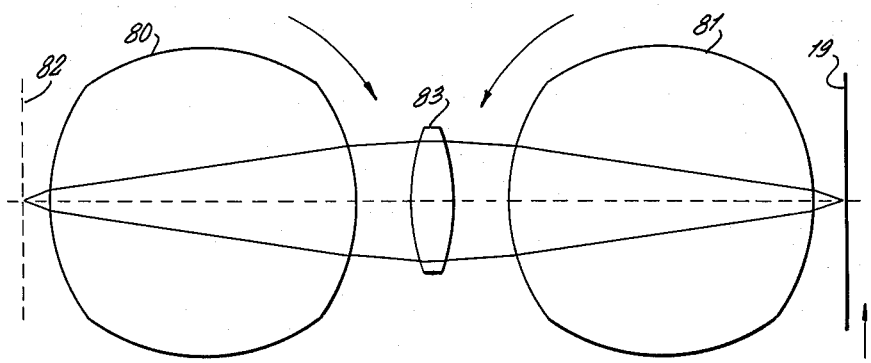

FIG. 15 shows another alternate system. Two refractors are used, rotating in opposite directions so that the active surfaces move simultaneously in the same direction. Refractor 80 can be considered to act as the refractor shown in FIGS. 5, 6 and 7, while refractor 81 operates as that shown in FIG. 13, although it rotates in the opposite direction because in this case a relay image 82 is formed, which in turn is projected onto a screen by means of a conventional projection lens, (not shown). This system could be designed so that the surfaces of the refractors by themselves focus the image at 82, but in practice it is better to introduce an auxiliary lens 83 to aid in the design of a corrected optical system.

It should be noted that, although some of the accompanying drawings show a four-sided refractor while others shown a six-sided one, refractors having any number of surfaces can be used in any of the optical arrangements described above. Also to be pointed out is the fact that, while most of the drawings, for more clarity, shown the film following a straight path, it is preferable in most cases to use a curved path such as that shown in FIG. 13, in order to compensate for the curvature of field of the optical system.

It is to be understood that although this optical compensator has been described with reference to its use in motion picture cameras and projectors, it also has applications in any other case where it is desired to displace an image at a predetermined rate of movement.

What is claimed is:

1. In a motion picture apparatus of the non-intermittent type using film having discrete frames, an optical motion rectifier for converting the continuous motion of the film into an intermittent production of the images of said frames in a predetermined image plane, said rectifier comprising a rotatable refractor having an axis of rotation at its center and including a plurality of convex surfaces of equal radii of curvature and subtending equal angles, said convex surfaces having their centers of curvature symmetrically positioned around the axis of rotation, each center of curvature positioned beyond said axis away from its surface, the distance between the axis and each center of curvature being not greater than $$\frac{R}{3 \sin \phi}$$

where $R$ is the radius of curvature of the convex surfaces and $\phi$ is an angle equal to 180° divided by the number of surfaces in the refractor.

2. In a motion picture apparatus of the non-intermittent type using film having discrete picture frames, an optical motion rectifier for converting the continuous motion of the film into an intermittent production of the images of said frames in a predetermined image plane, said rectifier comprising a rotatable transparent refractor having an axis of rotation at its center and including a plurality of convex spherical surfaces of equal radii of curvature and subtending equal solid angles, said convex surfaces having their centers of curvature symmetrically positioned around the axis of rotation, each center of curvature positioned beyond said axis away from its surface, the distance between the axis and each center of curvature being not greater than $$\frac{R}{3 \sin \phi}$$

where $R$ is the radius of curvature of the convex surfaces and $\phi$ is an angle equal to 180° divided by the number of surfaces in the refractor, said refractor rotatable on its axis which is perpendicular to a light beam passing through the film and the refractor.

3. In an apparatus for continuous feed of motion picture film having a plurality of discrete spaced framed pictures, a source of light with optical means for projecting a beam of light through the film, a projecting lens in alignment with said beam for forming a picture on a viewing screen, a rotatable refractor having an axis of rotation at its center and including a plurality of convex spherical surfaces of equal radii of curvature and subtending equal solid angles, said convex surfaces having their centers of curvature symmetrically positioned around the axis of rotation, each center of curvature position beyond said axis away from its surface, the distance between the axis and each center of curvature being not greater than $$\frac{R}{3 \sin \phi}$$

where $R$ is the radius of curvature of the convex surfaces and $\phi$ is an angle equal to 180° divided by the number of surfaces in the refractor, and means for rotating the refractor.

4. An apparatus as claimed in claim 3 whereby said film is moved through an object plane of said projecting lens at a predetermined speed and said refractor is turned at a speed so that one of said spherical surfaces passes through the light beam during the time one frame of the film is displaced by its adjacent frame.

5. An apparatus as claimed in claim 3 wherein said optical means includes a focusing means for forming an image of the pictures on the film in an image plane.

6. An apparatus as claimed in claim 5 wherein an additional projection lens is employed to relay the image of said pictures onto a viewing screen.

7. An apparatus as claimed in claim 5 wherein said film is provided with reference marks adjacent to the edges of the film with means for using said marks to control the speed of a motor which rotates the refractor and therefore maintain synchronism between the film frames and the refractor convex surfaces.

8. In a motion picture apparatus of the non-intermittent type using film having discrete frames and spaced sprocket holes along one of its edges, an optical motion rectifier for converting the continuous motion of the film into an intermittent production of the images of said frames in a predetermined image plane, said rectifier comprising a rotatable refractor having an axis of rotation at its center and including a plurality of convex spherical surfaces of equal radii of curvature and subtending equal solid angles, said convex surfaces having their centers of curvature symmetrically positioned around the axis of rotation, each center of curvature positioned beyond said axis away from its surface, the distance between the axis and each center of curvature being not greater than $$\frac{R}{3 \sin \phi}$$

where $R$ is the radius of curvature of the convex surfaces and $\phi$ is an angle equal to 180° divided by the number of surfaces in the refractor, and means for moving the film and rotating the refractor in synchronism; said means including a source of rotary power, sprocket holes in the film along one of its edges, a sprocket wheel coupled to the source of power, and coupling means between the source of power and the refractor.

9. In a motion picture apparatus of the non-intermittent type using film having discrete frames, an optical motion rectifier for converting the continuous motion of the film into an intermittent production of the images of said frames in a predetermined image plane, said rectifier comprising a rotatable refractor having an axis of rotation at its center and including a plurality of convex spherical surfaces of equal radii of curvature and subtending equal solid angles, said convex surfaces having their centers of curvature symmetrically positioned around the axis of rotation, each center of curvature positioned beyond said axis way from its surface, the distance between the axis and each center of curvature being not greater than $$\frac{R}{3 \sin \phi}$$

where $R$ is the radius of curvature of the convex surfaces and $\phi$ is an angle equal to 180° divided by the number of surfaces in the refractor, and means for continuously moving the film and rotating the refractor in synchronism with each other, said means including a series of spaced density marks on the film, light sensing means for determining the passage of the marks past an index position, an electrical transducer connected to said light sensing means for generating an electrical pulse each time one of said marks passes the index position, and an electrical motor mechanically coupled to said refractor and controlled by the pulses to turn the refractor so that one of said spherical surfaces moves past the image plane during the time one of the frames passes the index position.

10. In a motion picture apparatus of the non-intermittent type an optical compensator consisting of a solid body of transparent refracting material mounted to turn about an axis of rotation, said body bounded by a plurality of convex spherical surfaces of equal radii symmetrically located on its periphery, said surfaces having their centers of curvature in a plane perpendicular to the axis of rotation, said centers being equidistant from the axis and subtending equal angles about it, each of said angles being equal to $2\phi$ and the distance between each center of curvature and the axis of rotation being not greater than $$\frac{R}{3 \sin \phi}$$

where $R$ is the radius of curvature of the convex surfaces and $\phi$ is an angle equal to 180° divided by the number of surfaces in the refractor.

11. In a motion picture apparatus of the non-intermittent type an optical compensator consisting of a solid body of transparent refracting material mounted to turn about an axis of rotation, said body bounded by a plurality of convex spherical surfaces of equal radii symmetrically located on its periphery, said surfaces having their centers of curvature in a plane perpendicular to the axis of rotation, said centers being equidistant from the axis and subtending equal angles about it, said compensator being part of the image-forming optical system of said apparatus, said convex surfaces traversing the optical axis of the optical system during rotation of the refractor said optical axis intersecting the axis of rotation in the same plane that contains the centers of curvature of the convex surfaces, the distance between the axis of rotation and each center of curvature being not greater than $$\frac{R}{3 \sin \phi}$$

where R is the radius of curvature of the convex surfaces and $\phi$ is an angle equal to 180° divided by the number of surfaces in the refractor.

References Cited by the Examiner
UNITED STATES PATENTS

| | | | |
|---|---|---|---|
| 2,013,350 | 9/1935 | Leventhal | 352—119 |
| 2,132,003 | 10/1938 | Holst | 352—17 |

JULIA E. COINER, *Primary Examiner.*